Feb. 18, 1964 — R. W. VARRIAL — 3,121,253
APPARATUS FOR FORMING PIPE INSULATION SLEEVES
Filed Dec. 20, 1960 — 4 Sheets-Sheet 3
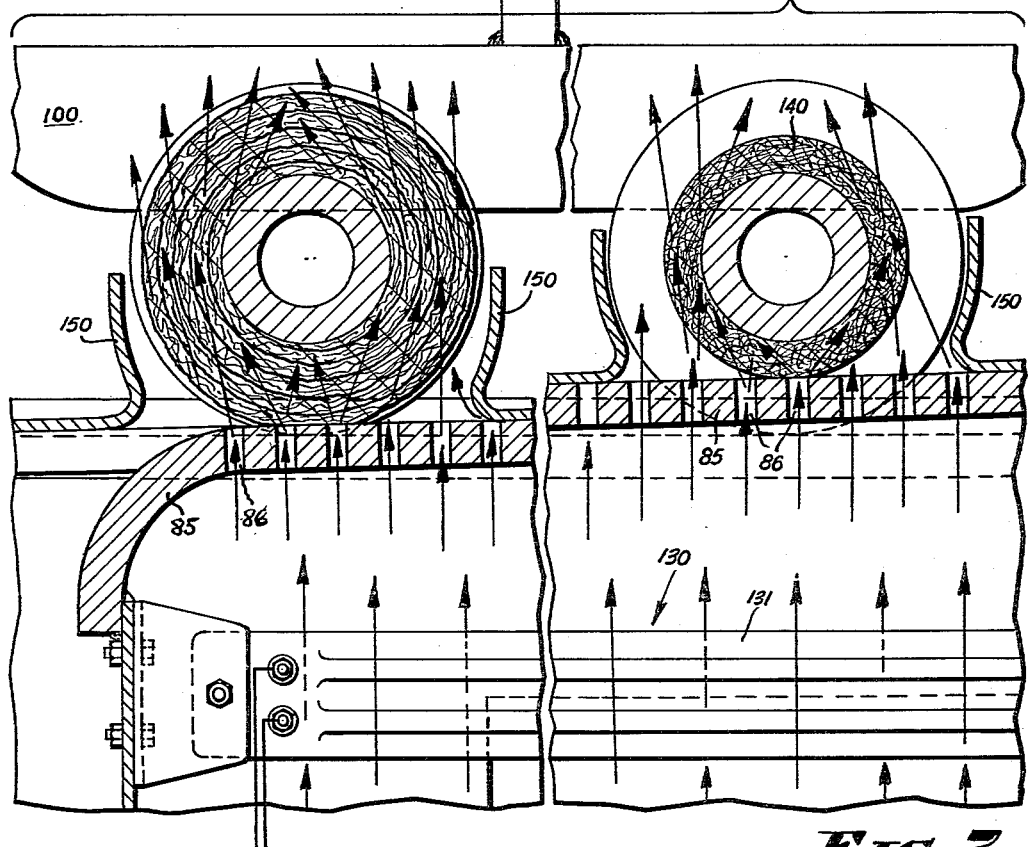
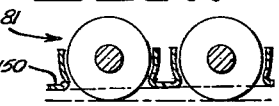
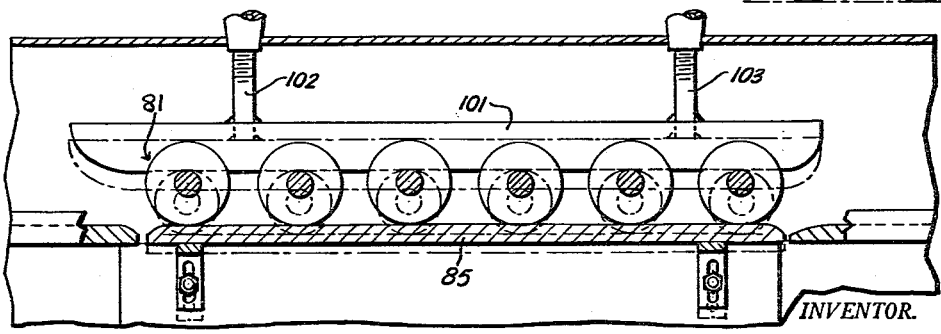
INVENTOR.
RALPH W. VARRIAL
BY: Beau, Brooks, Buckley & Beau,
ATTORNEYS.

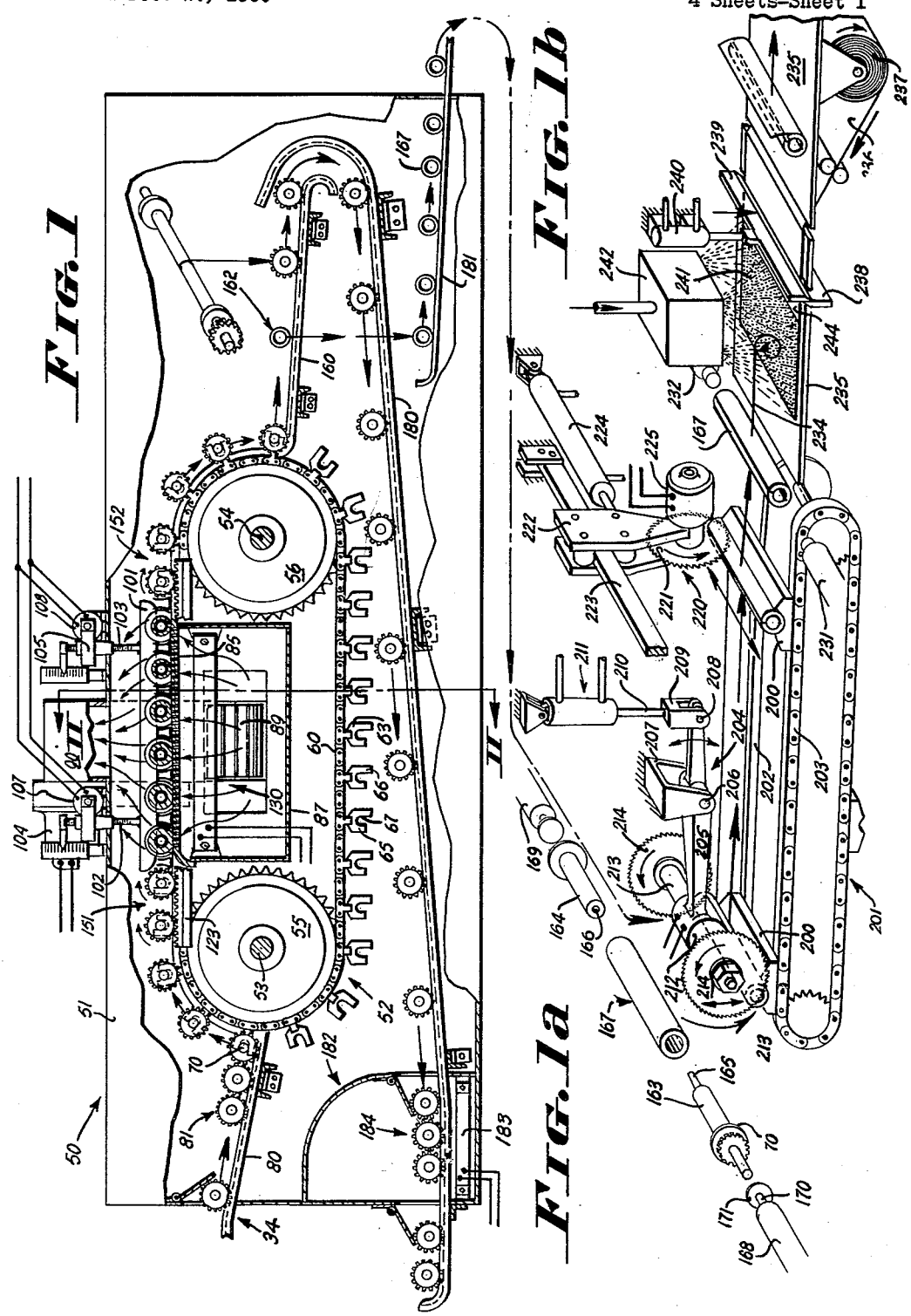

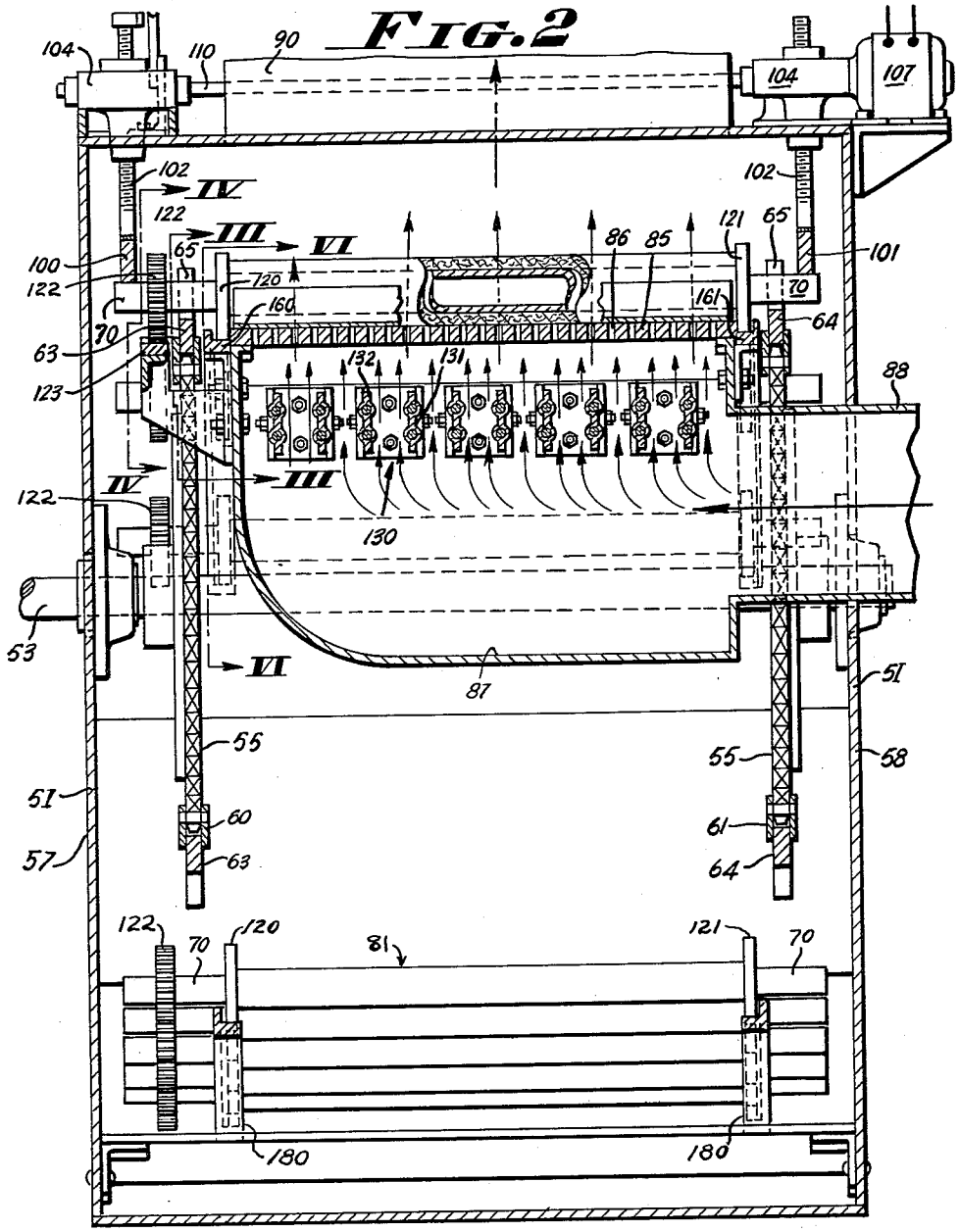

Feb. 18, 1964   R. W. VARRIAL   3,121,253
APPARATUS FOR FORMING PIPE INSULATION SLEEVES
Filed Dec. 20, 1960   4 Sheets-Sheet 4

INVENTOR.
RALPH W. VARRIAL

BY: Beau, Brooks, Buckley & Beau,
ATTORNEYS.

United States Patent Office 3,121,253
Patented Feb. 18, 1964

1

3,121,253
APPARATUS FOR FORMING PIPE INSULATION
SLEEVES
Ralph W. Varrial, Niagara Falls, N.Y., assignor to Bell
Aerospace Corporation, Wheatfield, N.Y.
Filed Dec. 20, 1960, Ser. No. 77,128
2 Claims. (Cl. 18—5)

This invention relates to apparatus for producing sleeves, tubes or cylinders from sheet material and especially to the production of insulating sleeves for pipes in which the invention, although not specifically limited to the production of insulating sleeves, nevertheless lends itself readily thereto. The principal object of the invention resides in the formation of sleeves from sheet stock in which the stock is in the form of blankets or roils of glass fiber impregnated with uncured or partially cured synthetic resin, the process and apparatus for carrying it out being such as to result in economical production.

One of the underlying principles of the present invention is to form a loose roll of resin-impregnated sheet stock upon a mandrel and to subsequently heat and compress this roll in such a way as to rapidly and efficiently reduce the loose roll to a compressed, cured state of substantially homogeneous nature characterized by high density and good insulating properties.

Another object of this invention is to provide a machine of the character described in which a plurality of mandrels are utilized not only to effect the initial wrapping of sheet stock thereon but also to act in cooperation with combined heating and compressing means to effect the compression and heat treating of the so-wound stock. More particularly, the mandrels are provided with means cooperable with inlet conveyor mechanisms not only to effect a translation of the mandrels and stock wound thereon through the heating and compressing means but also to rotate the stock against a heating table to progressively effect the compression thereof. Further, the mandrels are formed of separable sections whereby they may be withdrawn from the compressed and treated stock after passing from the compressing and heating means.

A further object of this invention is to provide a novel compressing and heat treating means as above described which constrains the mandrels with the stock wound thereon to motion along a path which progressively decreases in height relative to the heating table to not only effect the heating and curing of the stock but also to simultaneously effect progressive and compression of the stock wound upon the mandrel.

Still another object of this invention is to provide a machine of the character described in which the compressed sleeves, after their removal from the mandrels, are subjected to a longitudinal slitting operaton whereafter they are covered with an outer layer of wrapping material having adhesive applied thereto but only in a specific area thereof, leaving an edge flap free of adhesive so as to be subsequently adhered in overlapping relationship to the longitudinal extending slit permitting the sleeve to be spread apart and placed over an associated pipe before such flap is adhered to the sleeve.

FIG. 1 is a side elevational view of a portion of the machine constructed in accordance with the present invention with parts thereof broken away and in section to illustrate the various stages of the operation thereof;

FIG. 1A is an exploded perspective view illustrating the sectional mandrel in association with a compressed sleeve and also showing the mechanism for effecting the separation of the mandrel pieces;

FIG. 1B is a perspective view showing the end trimming, slitting and wrapping portions of the machine;

FIG. 2 is a vertical transverse section taken substan-

Figure 8:
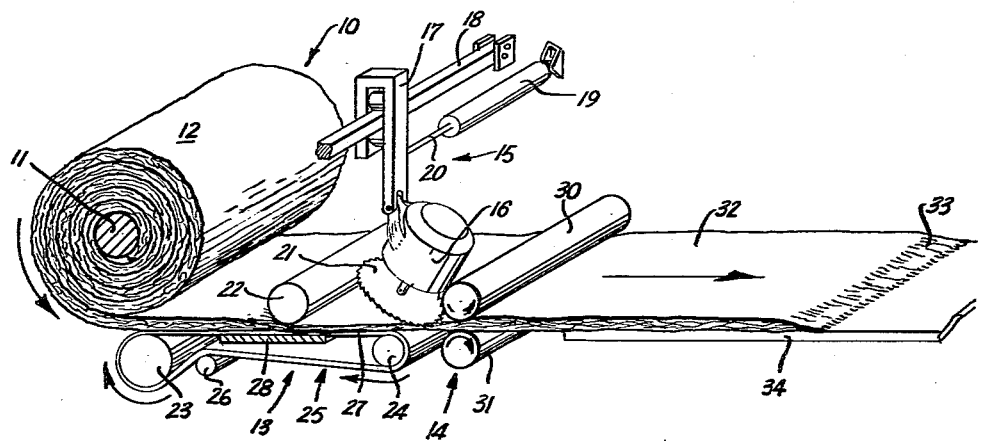
Figure 9:
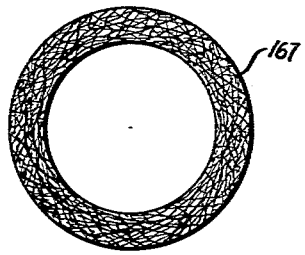
Figure 10:
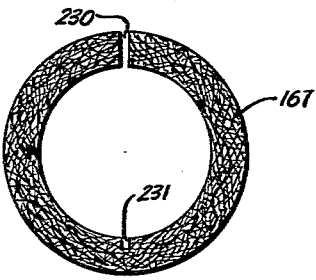
Figure 11:
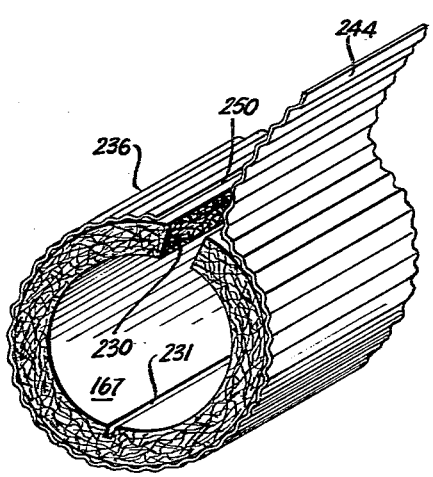

2 tially on line 2—2 in FIGURE 1, and showing, in enlarged scale, details of the combined heat treating and compressing mechanism and the relationship of the mandrels used in association therewith;

FIG. 3 is a side elevational view of a portion of the conveying means of the combined heat treating and compression mechanism illustrating the manner in which translatory motion of the mandrels is effected;

FIG. 4 is a side elevational view of a portion of the combined heating and compressing mechanism illustrating the rack arrangement cooperative with the mandrel to effect rotary motion thereof as the same are translated through this mechanism;

FIG. 5 is an enlarged vertical longitudinal section taken through the combined heat treating and compression means and illustrating the principle of progressive compression of the sheet stock wound upon the mandrels;

FIG. 6 is a vertical sectional view illustrating the manner in which the compression mechanism may be adjusted to effect different degrees of compression and/or to provide for operation upon a larger or smaller mandrel as desired;

FIG. 7 is a sectional view illustrating baffle means utilized in conjunction with the conveyor apparatus to effect a more efficient distribution of the heating air passing through the glass fiber sleeves;

FIG. 8 is a perspective view illustrating the supply roll and the means for effecting the separation of the sheet stock into predetermined lengths for ultimate wrapping upon an associated mandrel;

FIG. 9 is a transverse sectional view taken through an insulating sleeve before the slitting and wrapping operations are performed thereon;

FIG. 10 is a view similar to FIG. 9 but showing the sleeves subsequent to the slitting operation;

FIG. 11 is a partial perspective view showing one end of a completed sleeve assembly illustrating the wrapping therefor and showing the manner in which an edge portion of the wrapping material is free to permit spreading apart of the sleeve so as to be disposed over an associated pipe.

Referring now more particularly to FIG. 8, the machine, as shown therein, mounts a supply roll indicated generally by the reference character 10 which is in the form of a spindle 11 being wound with a blanket or sheet of fiberglass material 12 impregnated with uncured or partially cured synthetic resin. The spindle 11 is not driven but is free to rotate and the material is fed therefrom by means of the intermittent conveyor assemblage indicated generally by the reference character 13 and the nip rollers indicated generally by the reference character 14. A severing station is indicated generally by the reference character 15 and includes a saw 16 fixed to a transversely movable carriage 17. The carriage 17 is mounted for movement on the overhead rail 18, motion being imparted thereto by means of a fluid motor having a fixed cylinder 19 and an extensible piston rod 20. Suitable fluid connections are made to the opposite ends of the cylinder so that the saw is power-operated back-and-forth relative to the sheet issuing from roll 10.

The saw blade or abrasive wheel 21 is set on an angle as shown so as to effect a tapered or feather cut on the sheet stock, the purpose for which will be presently apparent.

The conveyor mechanism 13 includes a pair of spaced rollers 23 and 24 over which is trained an endless conveyor belt element 25 and in order to maintain this belt in taut condition, idler means such as roller 26 may be provided as shown. Underlying the upper flight 27 of the conveyor belt below the compressing roller element 22 is a back-up platform 28 which is cooperative with the overlying upper flight 27 and the roller 22 to permit the sheet stock 12 to be presented in generally taut and somewhat compressed condition when the saw blade 21 is cutting through the sheet stock. To accomplish this, the drive to the conveyor assemblage 13 is intermittent and is coordinated with the action of the saw 16 so that when the saw is cutting, the motion of the conveyor assemblage 13 is ceased. At the same time, drive to the nip rollers 30 and 31 is ceased and these rollers, in cooperation with the roller 22, hold the material taut for proper cutting action by the saw blade 21 as the same is caused to traverse the sheet stock. The angle of saw blade 21 produces a tapering or knife edge effect where the sheet stock is severed. This tapering effect is illustrated at the forward end 33 of the sheet 32 in FIG. 8.

The purpose of tapering the end portions of the sheet lengths is to permit the same to be wound upon mandrels, without forming transversely extending ridges or seams. The rolling of the lengths of material on mandrels may be accomplished in any suitable manner and forms no part of the present invention.

Referring now more particularly to FIG. 1, the heating and compressing mechanism as illustrated by reference character 50 therein may be provided with a housing 51 enclosing an endless conveyor mechanism indicated by the reference character 52 and which includes the spaced shafts 53 and 54, each of which has a pair of sprockets 55 and 56 secured thereto. As best seen in FIG. 2, the sprockets are disposed adjacent the respective opposite sides 57 and 58 of the housing 51 and trained over the alined sprockets on the two shafts 53 and 54 are endless chain members 60 and 61. Fixed to each of the chains 60 and 61 at spaced intervals therealong are yoke elements 63 and 64 each of which includes a leading shorter leg 65 and a trailing longer leg 66 presenting a semicircular recess 67 therebetween so as to receive the ends portions 70 of the mandrel. (See FIG. 3.)

Leading into the enclosure 51 is an extension 80 of the plate or platform 34, which portion 80 is inclined downwardly as shown in FIG. 1 to feed the loaded mandrels 81 to the conveyor mechanism 52. The platform 80, it will be appreciated, is narrower than the spacing between the chains 60 and 61 leaving the opposite end portions or trunnions 70 of the mandrels protruding on either side thereof so as to be engaged by the yokes 63, 64 and picked up thereby so that the loaded mandrels are carried along by pairs of transversely alined yokes on the two chains 60 and 61 to be carried along over the upper flight of the chains. Disposed between the upper flights of the chains 60 and 61 is a platform or table 85 having a plurality of openings 86 therethrough throughout the area of the platform or table and communicating with the underside of this table 85 is a plenum chamber 87 having an entrance duct 88 leading outwardly from one side thereof between the upper and lower flights of the chain 61 and outwardly through the housing or enclosure 51. The entrance inlet duct 88 is connected to a fan or blower such as is indicated by the reference character 89 in FIG. 1. The upper portion of the enclosure 51 is provided with a collector or outlet chamber 90 which connects to the inlet of the blower 89.

Located outboard on the chains 60 and 61 are pressure plates 100 and 101 each of which is carried by a pair of worm or screw members 102 and 103 which extend vertically upwardly therefrom and pass through casings 104 and 105 mounted on the machine and which contain nut elements engaged with the screw thread members 102 and 103. Each transversely alined pair of screw thread members 102 and 103 is provided with a drive motor assembly 107 and 108 to effect the vertical positioning of the pressure plates 100 and 101. Each such motor is connected to an elongated drive shaft 110 passing through the casings 104 and having suitable worm elements disposed therewithin engaged with the nut members on the screw thread members 102 and 103 so that as the motors 107 and 108 are driven in either direction of rotation, the screw thread members 102 and 103 will be moved vertically upwardly or downwardly as the case may be so as to adjust the position of the pressure plates 100 and 101 accordingly.

As is best illustrated in FIG. 2, the end portions 70 of the mandrels underlie and bear against the pressure plate 100 and 101. As can also be seen in this figure each mandrel is provided with a pair of end plates or discs 120 and 121 between which the roll of material is disposed and one end of each mandrel is provided with a gear 122 which is engageable with a stationary rack member 123 disposed at one side of the machine outboard of the corresponding chain 60. The gears 122 engage with the rack 123 as the mandrels are carried along the upper flight of the conveyor assembly 52 and the mandrels are consequently constrained to rotate as soon as the gears engage the rack 123. The table 85 is inclined upwardly with respect to the pressure plates 100 and 101, or vice versa, this relationship being best seen in FIGS. 1 and 5 and, consequently, as the mandrels are moved along over the table 85 and rotated by the action between the gears 122 and the rack 123, the material initially wound loosely upon the mandrels is compressed tightly in the manner best illustrated in FIG. 5. It will be noted that this compression takes place progressively as the mandrels move along the length of the table 85 and also that the compression takes place at the point at which the glass fiber contacts the table 85. Carried within the plenum chamber 87 are a series of heating elements indicated generally by the reference character 130 which preferably take the form of vane element 131 enclosing separate heating rods or elements 132 (preferably electric) substantially as is shown in FIG. 2. The vanes direct the incoming air from the duct 88 upwardly through the openings 86 in the table 85 in the manner illustrated in FIG. 5 and consequently the compression of the glass fiber 140, see particularly FIG. 5, is effected right at the point of greatest heating effect. The temperature of the air and of the table 85 combined are sufficient to cure the synthetic resin impregnated in the glass fiber 140 so that by the time the mandrels have passed beyond the pressure plates 100 and 101, the synthetic resin is cured or set to maintain the compression of the glass fiber and hold the same to its compressed shape. To aid in maintaining the flow of hot air through and closely around the material 140, removable baffle members 150, see particularly FIG. 5, may be placed between adjacent mandrel assemblages. This may be effected by any conventional means for placing these baffles on the chains 60 and 61 just prior to passage of the mandrels beneath the pressure plates 100 and 101, subtantially at a point as indicated by the reference character 151 in FIG. 1. These baffles are removed by any conventional means after the mandrels have passed through the heat treating station substantially at a point as indicated by the reference character 152 in FIG. 1.

The mandrels are laterally guided in their movement through the heating and compressing station by means of track members 160 and 161, see particularly FIG. 2, the end plates 120 and 121 being engageable thereagainst. However, it is to be appreciated that the end plates do not rest upon these tracks during the compressing process. These tracks continue beyond the conveying mechanism 52, see particularly FIG. 1, the portions beyond the conveying mechanism being inclined downwardly as shown to permit the mandrel to roll by gravity until they reach the point indicated generally by the reference character 162 at which time the mandrels are removed from the compressed and cured sleeves. The manner in which this is effected is shown best in FIG. 1A.

Each of the mandrels is formed of two sections 163 and 164, one of which is provided with a tapered pin portion 165 received in a correspondingly tapered socket portion 166 of the other section and which, when joined, form the spindle for receiving the sleeves 167. Magnetic mechanisms 168 and 169 suitably mounted and located at opposite sides of the tracks 160 and 161 are provided with extensible and retractable piston rods 170 carrying electromagnetic elements 171 at their free ends which are extended to engage the opposite ends of the mandrel portions 70 at point 165 which ceases the motion of the mandrel and then the rods 170 are retracted to separate the two sections 163 and 164 of the mandrel and permit the sleeve 167 to drop between the tracks 160 and 161 and also the underlying mandrel return tracks 180 located therebelow as shown in FIG. 1. These cured and compressed sleeves fall onto an inclined table 181 which passes outwardly through the machine as shown in the right hand end of FIG. 1. After the mandrel sections have been withdrawn, they are reassembled by the members 168 and 169 and released therefrom to pass to the inclined return tracks 180 passing beneath the conveyor member 52 and which permit the unloaded mandrels to roll therealong into a heating chamber indicated generally by the reference character 182. Any suitable electric heating means 183 is located within this chamber 182 and as the mandrels as indicated by the reference character 184 accumulate in the heating chamber, they are brought up to the operating temperature as mentioned hereinbefore so that when they are removed from the chamber 182 as shown at the left hand side of FIG. 1, for engagement with the loose sheet as indicated in FIGS. 12 and 13, the mandrels will be at the proper temperature to cooperate with the moistened end portion of the bat or sheet 32 to adhere thereto as mentioned hereinbefore.

After passing along the discharge table 181, the compressed and cured tubes or sleeves 167 are discharged onto the pillow blocks 200 carried by the endless conveyor mechanism indicated generally by the reference character 201 and which may comprise a pair of endless chain members 202 and 203 rigidly mounting the pillow blocks 200 substantially as is shown. Each pillow block is provided with a semicircular trough into which the sleeves 167 are received and as the sleeves are carried along the conveyor mechanism 201, they are first subjected to an end trimming operation as effected by the mechanism indicated generally by the reference character 204 in FIG. 1B. This mechanism may take the form of a pivoted arm 205 carried by a shaft 206 mounted on a stationary bracket 207. One end of the arm is pivotally joined as at 208 to the clevis 209 on the end of a piston rod 210 of a hydraulic or pneumatic motor indicated generally by the reference character 211. The opposite end of the arm 205 carries an electric motor 212 having drive shaft portions 213 projecting from opposite sides thereof to which are fixed rotary saw blades 214 disposed so as to be spaced apart a distance corresponding to the finished length of each of the sleeves 167. The motor 211 swings the saw blades 214 into engagement with the sleeves 167 and trims the ends thereof, as the conveyor moves the sleeves in the pillow blocks along the same in the direction of the arrows indicated in FIG. 1B. The motion of the conveyor mechanism 201 is intermittent so as to cause the sleeves to pause at the trimming station and to also pause at the slitting station indicated generally by the reference character 220. The longitudinal slitting is achieved by means of a saw 221 mounted on the carriage 222 which guidably engage on a transverse rail or guard member 223 as shown and which is reciprocated back and forth along this guide rail 223 by means of a hydraulic or pneumatic motor 224. The carriage 222 mounts an electric motor 225 whose drive shaft is directly connected to the saw 221 for rotating the same.

The slitting is carried out in the manner indicated best by FIG. 10 wherein it will be seen that the cured sleeve 162 is completely slit as indicated by the reference character 230 and it also is notched as indicated by the reference character 231. This permits the sleeve to be easily spread later on when it is applied to a pipe as a covering therefor.

The slit sleeves are engaged at a pick-up station by hydraulic pick-up ram elements 231 and 232 as shown in FIG. 1B which extend into the opposite ends of the sleeves and clamp them therebetween. The pickup rams 231 and 232 are translated in the direction of the arrow 234 in FIG. 1B and rotated approximately 200° to place the slit sleeves on the table 235. Fed onto the table 235 by any suitable means is a sheet of wrapping material 236 from a supply roll 237 substantially as shown, the sheet extending upwardly through a slot or interruption in the table 235. Suitable cutter elements 238 and 239 cooperate, by the vertical reciprocation of the upper blade 239 under the action of a hydraulic or pneumatic motor 240 to sever the wrapping material at the appropriate point and the major area 241 thereof is subjected to the application of an adhesive coating by means of the spray head mechanism 242 which is mounted for vertical reciprocation thereof toward and away from the wrapping cover to apply the adhesive in the localized area thereof as indicated in FIG. 1B, leaving an end portion 244 of the wrapping sheet free of adhesive for purposes presently to be explained.

Rotation of the rams 231 and 232 and translation thereof is continued after the slitted sleeves 167 is engaged with the wrapping sheet. As stated hereinbefore, the rotation of the sleeves 167 by the ram members 231 and 232 before the sleeves are engaged with the wrapping cover 236 is approximately 200° which places the edge 250, see FIG. 11, of the wrapping sheet just beyond the slit 230 and the extent of the adhesive material on the wrapping sheet is such as to terminate short of the opposite side of the slit 230 to leave the uncoated portion 244 of the wrapping sheet free to bridge the slit 230 after the wrapped sleeve is applied over a pipe by spreading the same along the slit 230 and as is enhanced by the provision of notch 231. Thereafter, suitable adhesive is applied to the end portion 244 and is applied over to the bridge the slit 230.

I claim:

1. An assembly for forming pipe insulating sleeves, comprising a plurality of mandrels for receiving strips of synthetic resin-impregnated glass fiber in loosely wrapped layers thereon, each mandrel including a spindle portion for receiving the glass fiber wrapping, circular end plates at the opposite ends of said spindle portion, trunnion portions extending axially beyond said end plates, a drive gear on one of said trunnion portions spaced both from the end thereof and from the associated end plate, and with said spindle portion being longitudinally separable between the end plates so that each mandrel is in two sections, a combined heat treating and compressing mechanism, said mechanism including a pair of endless chain conveyor members each carrying a plurality of yokes for engaging portions of said mandrel trunnions immediately outboard of said end plates, means for feeding the individual mandrels with their glass fiber wraps to said mechanism to be picked up by said yokes and transported along the upper flights of said chains, said mechanism also including a compressing table disposed between said upper flight of the chains and of a width just slightly less than the spacing between said mandrel end plates, a pair of pressure plates disposed outboard of said chains and above said table to overlie and engage with the ends of said mandrel trunnions, a fixed rack extending along one of said chains outboard thereof and inmeshable with said mandrel gears to rotate said mandrels as they are moved along said upper flights of the chains, said pressure plates and said table presenting opposed surfaces having progressively decreasing vertical spacing to progressively compress the glass fiber as it is rolled along the table, said table being perforate, said mechanism also including means for directing heated air upwardly through said table, a pair of mandrel-end-plate-engaging tracks leading from said mechanism, means beyond said mechanism for axially separating said mandrel sections and withdrawing the spindle portions thereof from the compressed glass fiber.

2. An assembly for forming pipe insulating sleeves, comprising a plurality of mandrels for receiving strips of synthetic resin-impregnated insulating fiber in loosely wrapped layers thereon, each mandrel including a spindle portion for receiving the glass fiber wrapping and end portions extending axially from the opposite ends of said spindle portion, a combined heat treating and compressing mechanism, said mechanism including a compressing table and means for heating such compressing table, means for translating said mandrels across said compressing table while rotating the same to roll the resin-impregnated insulating fiber across the surface of said compressing table, a pair of pressure plates disposed outboard of said spindle portions of each mandrel and engaging said end portions of each mandrel, said pressure plates being spaced above said table and progressively decreasing in their spacing in the direction of movement of the mandrels to compress the insulating fiber upon the mandrels as the mandrels are translated across the table.

References Cited in the file of this patent

UNITED STATES PATENTS

| | | |
|---|---|---|
| 2,046,047 | Watkins | June 30, 1936 |
| 2,428,653 | Collins | Oct. 7, 1947 |
| 2,489,121 | Collins | Nov. 22, 1949 |
| 2,778,759 | Stephens et al. | Jan. 22, 1957 |
| 2,946,371 | Stephens et al. | July 26, 1960 |
| 3,063,887 | Labino | Nov. 13, 1962 |